July 23, 1968  P. D. WURZBURGER  3,393,931

TUBE COUPLING WITH BIAS CUTTING EDGE

Filed Feb. 7, 1966  2 Sheets-Sheet 1

INVENTOR.
PAUL D. WURZBURGER
BY
ATTORNEYS

July 23, 1968   P. D. WURZBURGER   3,393,931
TUBE COUPLING WITH BIAS CUTTING EDGE
Filed Feb. 7, 1966   2 Sheets-Sheet 2

INVENTOR.
PAUL D. WURZBURGER
BY
ATTORNEYS

# United States Patent Office 3,393,931
Patented July 23, 1968

3,393,931
TUBE COUPLING WITH BIAS CUTTING EDGE
Paul D. Wurzburger, 3255 E. Monmouth Road,
Cleveland Heights, Ohio 44118
Filed Feb. 7, 1966, Ser. No. 525,695
8 Claims. (Cl. 285—341)

ABSTRACT OF THE DISCLOSURE

A tube coupling for fluid conductors is provided wherein the gripping and sealing of the end of a tube is obtained by cutting an inclined, elliptical annular groove or grooves in and turning up an elliptical ridge or ridges on the exterior of the coupled tube or pipe. The cutting is accomplished through interconnected coupling members adapted to encompass the end of the tube and be moved axially toward one another to engage and work a coupling element or ring therebetween, and advance and constrict the elliptical cutting edge of the coupling element progressively into cutting engagement with the tube.

---

This invention relates to couplings for fluid conductors and more particularly to improvements in the type of coupling in which the gripping and sealing of the tube is obtained by cutting an annular groove or grooves in and turning up an adjacent ridge or ridges on the exterior of the coupled tube or pipe. Illustrative forms of such couplings appear in U.S. Patents Nos. 2,171,217, 2,139,413 and 2,230,116 and in my prior U.S. Patents Nos. 2,414,184, 2,474,178, 2,693,374, 2,693,376 and 3,157,943.

My present invention offers solutions to long standing problems in the prior art of coupling. Old problems of withstanding vibrational and flexing stresses are solved by my present invention. Spring-back of the sleeve relative to the tube which has heretofore permitted relative rotation and leakage therebetween upon and after recoupling is a problem solved by my present invention. I also provide more efficient cutting per unit of torque required to effect the coupling. An object of my invention is to solve these problems.

An object of my invention is to provide a coupling in which the sleeve or ring and the tube are maintained in their original substantially integrated, fluid-tight relationship throughout all uncoupling and recoupling operations.

Another object of my invention is to provide a tube coupling having a cutting engagement between the coupling and the coupled tube which has at least all the resistance against blowout pressure and leakage of the most efficient of annular-cut type of couplings, but in which the tendency to crack, rupture or impair the tube under the influence of vibration or alternating flexure is appreciably and advantageously reduced, if not substantially eliminated.

To achieve my objects, I provide a tube coupling in which the coupling element, sometimes also called ring or sleeve, has an elliptical cutting edge for cutting an elliptical groove in and turning up an elliptical ridge on the external surface of the tube to be coupled, tending to distribute vibrational and other stresses longitudinally along the tube, and tending to cut an elliptical groove progressively and turn up an elliptical ridge on the external surface of the tube to be coupled progressively while the coupling work is being done but with reduced torque compared with making the initial cut all around the tube simultaneously.

One other object of this invention is to provide a ring, sleeve, or coupling element having an elliptical cutting edge usable in coaction with nuts and bodies of tube couplings wherein rings, sleeves, or coupling elements having annular circular cutting edges have heretobefore been employed.

These and other objects are achieved by providing, as an article of manufacture, a sleeve for tube couplings having a continuous, or substantially continuous, elliptical cutting edge harder than the tube and running around the inner edge of a forward face or shoulder; the major diameter of the elliptical cutting edge lying in a plane inclined from normalcy with respect to the axis of the sleeve and tube to be coupled, the sleeve being of sufficiently ductile material to permit the elliptical cutting edge to be contracted and sufficiently hard to shear into the external surface of the tube to be coupled.

My objects are also achieved by providing a tube coupling comprising: a body having abutment means adapted to limit relative movement of the tube end toward the body; a nut surrounding the tube and having threaded engagement with the body and/or adapted to be drawn up toward the body; a coupling element surrounding the tube between and in engagement with the body and the nut, the coupling element having a continuous annular portion and a continuous elliptical cutting edge adjacent to the tube running around on the inside forward edge of the annular portion with its major diameter lying on a plane inclined from normalcy with respect to the longitudinal axis of the annular portion: means acting to force the coupling element toward the body when the nut is drawn up toward the body; and means acting to constrict the elliptical cutting edge as the coupling element is forced toward the body, whereby, the elliptical cutting edge is constricted toward, cuts a continuous elliptical groove into, and shears a continuous elliptical ridge up from and around the exterior surface of the tube to form a fluid seal and hold the tube against axial separation from the body.

Accomplishment of these and other objects and advantages will appear from the following descriptions of illustrative and preferred forms of my invention; reference being had to the accompanying drawings in which.

Figure 5:
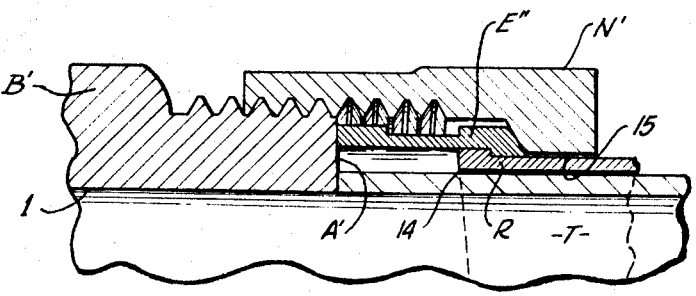
FIGURE 5 is a longitudinal section of another modified form of my invention embodied in a coupling similar to that shown in my prior patents with the cutting edge in the rear of the sleeve with the parts assembled prior to working.
Figure 6:
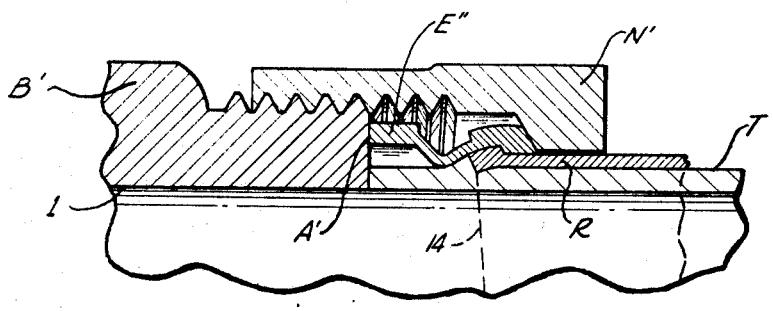

FIGURE 6 corresponds to FIG. 5 after the parts have been worked.

Figure 7:
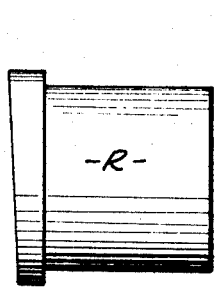

FIGURE 7 is a side elevation of the edge-bearing insert shown in FIGS. 5 and 6.

Figure 8:
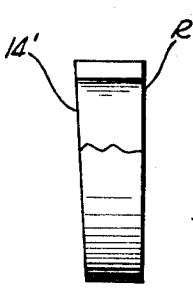
Figure 9:
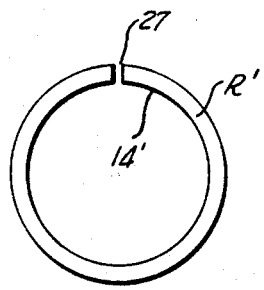

FIGURE 8 is a partially broken side elevation, and FIGURE 9 is an end view, of a modified form of edge-bearing insert embodying my invention for the type of coupling shown in FIGS. 5 and 6 following, however, my prior Patent No. 2,474,178 as to the split aspect of the ring.

Figure 1:
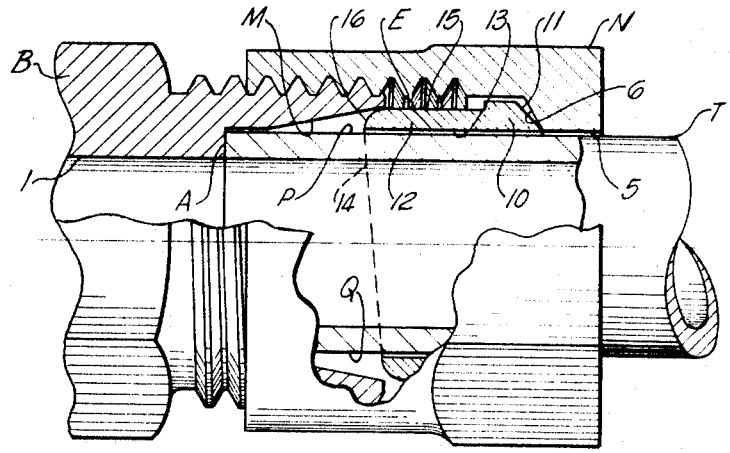
FIGURE 1 is a side elevation, partly in longitudinal section, of the assembled body, nut, coupling element, and tube prior to working the parts to couple the tube to the body.
Figure 2:
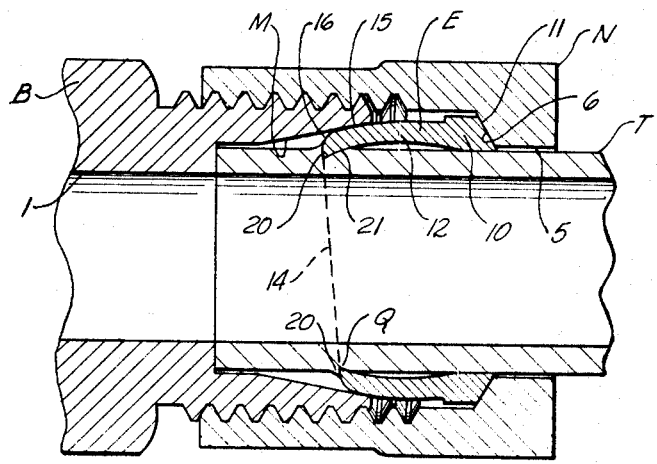
FIGURE 2 is a view corresponding to FIG. 1, showing the coupling after the parts have been worked.
Figure 3:
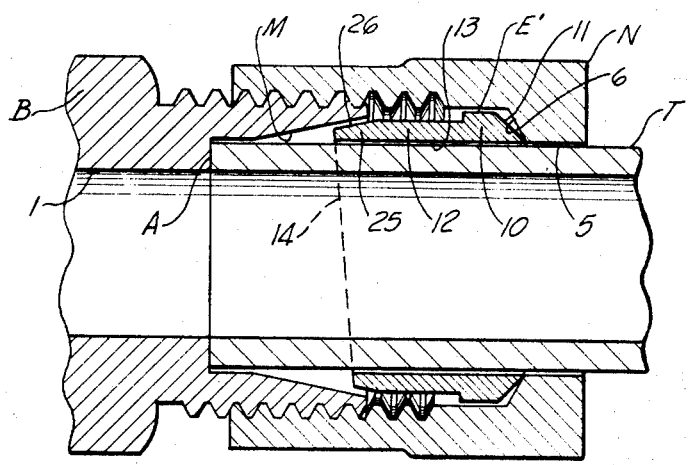
FIGURE 3 is a side elevation, partly in longitudinal section, of a modified form of my invention with the forward end of the coupling element having an exterior conical form.

Referring to FIGS. 1–3 in which a conventional environment for my invention, following such prior patents as Nos. 2,139,413 and 2,414,184, for example is shown, I employ an externally threaded body B having a rearwardly facing, right as viewed, flared mouth M embracing the end of the tube T to be coupled. The body B has a bore 1 co-extensive with the bore of the tube T and has an annular abutment A near the forward small end of the mouth M against which the forward end of the tube is forced and is restrained from forward motion. The flared mouth M is given conical form and the pitch thereof may lie between about 10 and 20 degrees. There is also shown an internally threaded nut N having a bore 5 coaxial with the bore of the body and the tube which is encompassed thereby. Near the forward end of the bore 5, the nut N has an inwardly and forwardly facing inclined, preferably substantially conical, female seat, i.e., camming shoulder 6, which engages with the camming shoulder 11 of the rearward thickened part 10 of the coupling element E which is worked toward the body B within the flared mouth M by the nut N. The nut N and body B are otherwise shown in their conventional forms and the terms, nut and body, are meant to include equivalent forms and instrumentalities such as flanged body and a flanged ring for doing the same or substantially the same work and getting the same or substantially the same results.

With reference now to FIGS. 1 and 2, a preferred form of my coupling element E has a rearward thickened annular portion 10 with its outer and rearwardly facing male shoulder 11 and has an elongated forward and central annular portion 12 with a wall thickness not unlike the wall thickness of the tube T and of sufficient axial strength to transmit desirable cutting and plowing forces to the forwardly and inwardly disposed, cutting edge 14, which departs from prior practice and takes elliptical instead of circular form. The major diameter of the ellipse of the cutting edge, and the plane thereof, is inclined from normalcy with respect to the longitudinal axis of the tube, sleeve and coupling. The diameter of the element E and therefore, the minor diameter of the cutting edge is just slightly larger than the exterior diameter of the tube T. The outward parts of the forward end 15 of the coupling element E is rounded at the forward outward corner 16 to permit smooth entry into, and smooth sliding, working engagement with, the flared mouth M of the body B without scuffing; the rounded forward corner 16 guiding the constriction of the elliptical cutting edge 14 into its cutting and plowing attack on the tube with both radial inward and axial forward motion similar to the prior patents, but with surprisingly better and different consequences. One teaching of the prior art is preferably followed in that the male shoulder 11 of the coupling element E is pitched a little less steeply than the female or camming shoulder 6 of the nut N with which it coacts, so that the central portion 12 of the coupling element tends to be bowed outwardly to a slight degree when the coupling element E is forcibly urged into the mouth M, tending, with the coaction of the mouth, to bow out the middle of annular portion 12 rearwardly adjacent the elliptical cutting edge 14 whereby to facilitate smoother entry into the mouth M, and provide a relief angle for the elliptical cutting edge 14 to cut and bite the tube.

In the form of my invention shown in FIGS. 1 and 2, when the nut N has begun moving and working the element E and has forced the forward rounded corner of the element E into forcible contact with and within the mouth M of the body, then the most forward portion of the element E, the upward and leftward part as viewed, will be first begin to be bent and constricted inwardly and bring the most forward portion only of the elliptical cutting edge 14 first into cutting contact and engagement with the exterior of the tube at approximately the point P on the "top" of the tube as viewed in FIG. 1. Continued forward motion of the nut N, progressively increases the length of circumferential contact of the rounded corner 16 in and within the mouth M, i.e., downwardly and around the tube as viewed in FIGS. 1 and 2, and, correspondingly increases the circumferential length of contact and cut between the edge 14 and the tube until complete cutting engagement is had by the most rearward portion of the elliptical edge as suggested at about the point Q, FIGS. 1 and 2. Thus, as distinguished from all prior practice, the elliptical cutting edge of my invention cuts both diagonal and progressively into the tube.

As the penetration, cutting and plowing of the tube T proceeds, the elliptical cutting edge 14 bites progressively more deeply into the tube as the element E is forcibly worked into the mouth M. Eventually, referring to FIG. 2, the elliptical cutting edge 14 cuts a circumferentially continuous, fore-and-aft inclined, longitudinally extended, elliptical groove 21 into, and shears a continuous elliptical ridge 20 up from and all round the exterior surface of the tube T. The forward end of the sleeve E forms a fluid-tight seal between the mouth of the body and the tube and provides a firm longitudinally extended mechanical engagement with the tube adjacent to and behind the cutting edge.

The grip and seal thus established has a significantly extended longitudinal zone of engagement between the body, the forward end of the sleeve and the tube with the much to be desired result of preventing a deleterious concentration of stress in the tube under the influence of vibration as well as restraining the sleeve against rotation or deleterious motion relative to the tube between uncoupling and recoupling operations.

Figure 4:
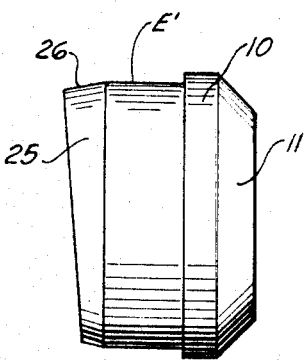
FIGURE 4 is a side elevation of the form of coupling element employed in the combination shown in FIG. 3.

The form of my invention illustrated in FIGS. 3 and 4 departs from the preceding form only in respect to the external configuration of the forward end of the coupling element E' which is given a conical external surface 26 pitched to be substantially congruent with the cone of the surface of the flared mouth M of the body. As shown in FIG. 3 the forward end 25 of the element E' will engage the mouth of the body all around the mouth on the surface 26 at about the same time, and the inward deflection of the cutting edge 14 will be substantially simultaneous all around the tube T with the small exception that the most forward portion 25 of the element E', being a little thinner than the other portions, will flex a little more readily and probably begin cutting engagement slightly ahead of the stiffer parts of the end portion 25. While this form of my invention does not emphasize the progressive cutting engagement of the edge 14 with the tube T, it does participate in this advantage and otherwise has the same parts, designated by the same reference characters which function and gain the same advantageous results as those described above with respect to the form of my invention illustrated in FIGS. 1 and 2.

In FIGS. 5, 6 and 7 I have illustrated an adaptation of my invention to the type of couplings shown in my prior patents wherein the, or one, cutting edge is located near the camming shoulders of the coupling element and the nut, see for example my Patents Nos. 2,693,374 and 2,693,376. The body B' in this modified form of my invention has the abutment A' for engaging the forward end of the tube T and also engaging and limiting forward (leftward) movement of the tube and the forward end of the coupling element E''. The nut N' in this modified form of the invention has a sufficiently larger bore to encompass both the tube T and the "tail" portion of the inner ring R on the inner forward edge of which the elliptical cutting edge 14 is formed and disposed.

The cutting ring R has a short, forward, thickened annular portion retained in the counterbore of the element E'' and a longer, rearward and thinner annular "tail" portion, both portions having a bore slightly larger than the outside diameter of the tube T. This is all specifically illustrated and described in FIGS. 8 and 9 of my Patent No. 2,693,374 and need not be enlarged upon here. The elliptical cutting edge 14 of my present invention is located and formed on the most forward and inner portion of the ring R where it will be worked in substantially the same way as the circular edge of my prior patent except as its action and results are improved by my present invention. Forward motion of nut N' with yielding radially inward flexing of the bridge of the element 2" induces forward and radially inward pressure upon the elliptical cutting edge 14 which cuts a continuous elliptical groove in and turns up a continuous elliptical ridge from, around and longitudinally along the exterior surface of the tube, see FIG. 6. Upon completion of the cut the bridge is constrained radially inward against the tube and the elliptical ridge formed on the surface of the tube so that the tube T is held against axial separation from the body, a fluid seal between the body B and the tube T is created, the element E", ring R and tube T are secured against relative rotation between recouplings, and a vibration resistant cut and bond is established between the coupling and the tube especially by the longitudinally extended cut and grip between the element and ring and the tube.

The two-piece construction of the coupling element with the ring R is advantageous in that relatively soft ductile material may be used in forming the element E" while at least the forward end of the ring R may be hardened to give cutting qualities desired for the elliptical cutting edge 14. In all events the ring R is adapted to be inserted in the bore and counterbore of the element E" with a pressed fit if the ring is a complete annulus, or by a tight spring fit if the ring is split as shown in FIGS. 8 and 9 hereof, or more fully in my prior Patent 2,474,178.

In FIGS. 8 and 9 I have shown a variant of the cutting ring R above described comprising the ring R' which lacks the "tail" portion of the ring R, and is split as at the gap 27, and is intended preferably to have a snug spring fit in the counterbore of the element or sleeve E" with the gap 27 opened appreciably, in substantially the same disposition as the thickened forward portion of the ring R. The bore of the nut N" will preferably be reduced appropriately in the absence of the "tail" portion of the ring. The inner forward edge of the ring R' will comprise the elliptical cutting edge 14' equal to the edge 14 except for the gap 27 therein. The cutting function, operation and results of this edge will proceed as in my prior patents augmented with the benefits of my present invention including the non-rotatable grip on the tube which is additionally facilitated by the longitudinal cut peculiar to the split ring cutting edge. This form of my invention will provide, as in the other forms, the diagonal cut of increased longitudinal extent with its vibration resistant effects. The ring R' lends itself to hardening in its entirety to gain a hardened cutting edge with advantageous facility. The ring R' with its non-circular cutting edge 14' also lends itself to incorporation in a forwardly disposed counterbore as illustrated and taught in the prior U.S. Patent No. 2,139,413 in respect to the disposition of a hardened annular ring having, however, only a circular cutting edge according to prior practice. When the ring R' is inserted in a counterbore in the "nose" of a coupling element I prefer that the element be cut on the bias like the elements E and E' herein so that the edge 14' would be located in substantially the same place as the edge 14.

The magnitude of the bias angle that the major diameter of the elliptical cutting edges 14 and 14' is inclined from normalcy with respect to the longitudinal axis of the coupling element is preferably determined, as follows: Generally speaking, if the angle is too large an incomplete groove is apt to be cut in the true and an incomplete ridge turned up resulting in an inferior or incomplete seal for lack of axial or radial, or axial and radial, cutting and plowing motion of the rearward and lagging part of the cutting edge. If the angle is too small, the cut and resulting contact tends to be little more than merely circular according to prior practice and therefore lacking the advantages of my invention. In general, the angle should not, as I presently believe, be in excess of 15 degrees. More specifically, the angle should preferably be calculated with respect to the axial advance required to the elliptical cutting edge during its plowing action as it is constricted into the tube after initial cutting contact with the tube, to accomplish the maximum desired cutting by the most forward part of the cutting edge. The longitudinal distance between the most forward i.e. leading part of the elliptical cutting edge and the most rearward, i.e. lagging part thereof is, as I presently prefer, from one-third to one-half of the total plowing advance of the edge as indicated above. With the recommended longitudinal distance calculated, the ratio of such distance to the external tube diameter, or the internal diameter of the edge-bearing element or ring, should indicate the tangent function for the desired bias angle. My preferred bias angle and tangent function therefore vary inversely with the size of the tubing to be coupled. For example, a coupling wherein the pitch of the flared mouth M is about 12°, the following are recommended: for 1/8" tubing the cutting advance here called (C.A.) is about 0.065" and the bias angle here called (B.A.) is about 15°; for 1/4" tubing, C.A. is about 0.075" and B.A. is about 8°; for 1/2" tubing, C.A. is about 0.094" and B.A. is about 4° 30'; for 1" tubing, C.A. is about 0.125" and B.A. is about 2° 45'; and for 2" tubing, C.A. is about 0.125" and B.A. is about 1° 30'.

The depth of the cut to be made by my elliptical cutting edge is often not iminently critical. In the coupling operation, however, it is preferable that appreciable cutting into the tube be accomplished at every point along the elliptical cutting edge including the most lagging portion thereof, and it is desirable that at each point the cut be made sufficiently deep to form its portion of a continuous elliptical groove in the tube surface and shear up its portion of a continuous elliptical ridge of appreciable size from the tube surface sufficient to withstand any specified blow-out pressure, generally at least equal to the bursting strength of the tube.

The coupling elements E and E' and rings R and R' may be made of C1113 low carbon and/or leaded, cyanide case hardened steel. Alternatively, C1010 cold drawn steel, machined and case hardened may be employed. The indicated methods for preparing the coupling elements may be applied to other suitable materials including brass and stainless steel. Work hardening of the elliptical cutting edges is often sufficient to make same desirably harder than the tubes or pipes of the same material, respectively to give the desired and characteristic mode of operation and results of this invention with desirable cutting, plowing and permanent gripping.

Changes and improvements in and upon the preferred forms and examples of my invention herein specifically disclosed may or will occur to those skilled in the art who understand and enjoy my invention, and I do not care to be limited in the scope of my patent to those forms, nor in any manner incommensurate with the progress in the art promoted by my invention.

I claim:

1. In a tube coupling wherein a coupling element has a cutting edge adjacent and encompassing the tube to be coupled and is worked to advance and constrict the cutting edge, including interconnected members and a coupling element encompassing the end of a tube and coacting means between said members to move said members axially toward one another to engage said coupling element confined therebetween and advance said coupling element relative to said tube toward one of the members and coacting means on said element and said member to constrict a cutting edge of said coupling element during said movement into biting engagement with the tube to cut a groove and turn up a ridge of appreciable size, the improvement comprising a coupling element substantially coaxial with said tube through said cutting and having a noncircular, curvilinear cutting edge substantially encompassing the tube, said cutting edge having a minor diameter before being constricted but slightly greater than the external diameter of the tube and a major diameter significantly greater than its minor diameter and lying in a plane inclined appreciably from normalcy with respect to the axis of the tube and the cutting element.

2. The improvement of claim 1 wherein the axial displacement of said inclined edge equals between about ⅓ to ½ the axial length of the finished cut in said bitting engagement with the tube to be coupled.

3. The improvement of claim 2 wherein the inclination of the plane of said edge ranges from about 15° for a ⅛" coupling to about 1° 30' for a 2" coupling.

4. The improvement of claim 1 wherein the said inclination of the plane of said edge is inversely related to the least diameter of the edge.

5. The improvement of claim 4 wherein said cutting edge is elliptical and the plane thereof is inclined from about 1° 30" to 15° to a plane normal to the axis of the element.

6. The improvement of claim 1 in combination with means for bringing said biting engagement about progressively from one place of first contact on one side of the tube to be coupled to full engagement all around the tube.

7. The improvement of claim 6 wherein the axial displacement of said inclined edge equals between about ⅓ to ½ the axial length of the finished cut in said bitting engagement with the tube to be coupled.

8. The improvement of claim 1 wherein said cutting edge is embodied in a split ring having a gap substantially aligned with the said major diameter of said edge.

References Cited

UNITED STATES PATENTS

| | | | |
|---|---|---|---|
| 2,147,354 | 2/1939 | Scholtes | 285—248 |
| 2,474,178 | 6/1949 | Wurzburger | 285—382.7X |
| 2,691,537 | 10/1954 | Bashark | 285—340 |
| 2,693,374 | 11/1954 | Wurzburger | 285—382.7 X |
| 2,738,994 | 3/1956 | Kreidel et al. | 285—341 |
| 2,805,873 | 9/1957 | Brennan et al. | 285—341 X |

FOREIGN PATENTS

| | | |
|---|---|---|
| 263,712 | 12/1926 | Great Britain. |
| 610,674 | 10/1948 | Great Britain. |
| 753,298 | 7/1956 | Great Britain. |

CARL W. TOMLIN, *Primary Examiner.*

D. W. AROLA, *Assistant Examiner.*